Patented Nov. 13, 1951

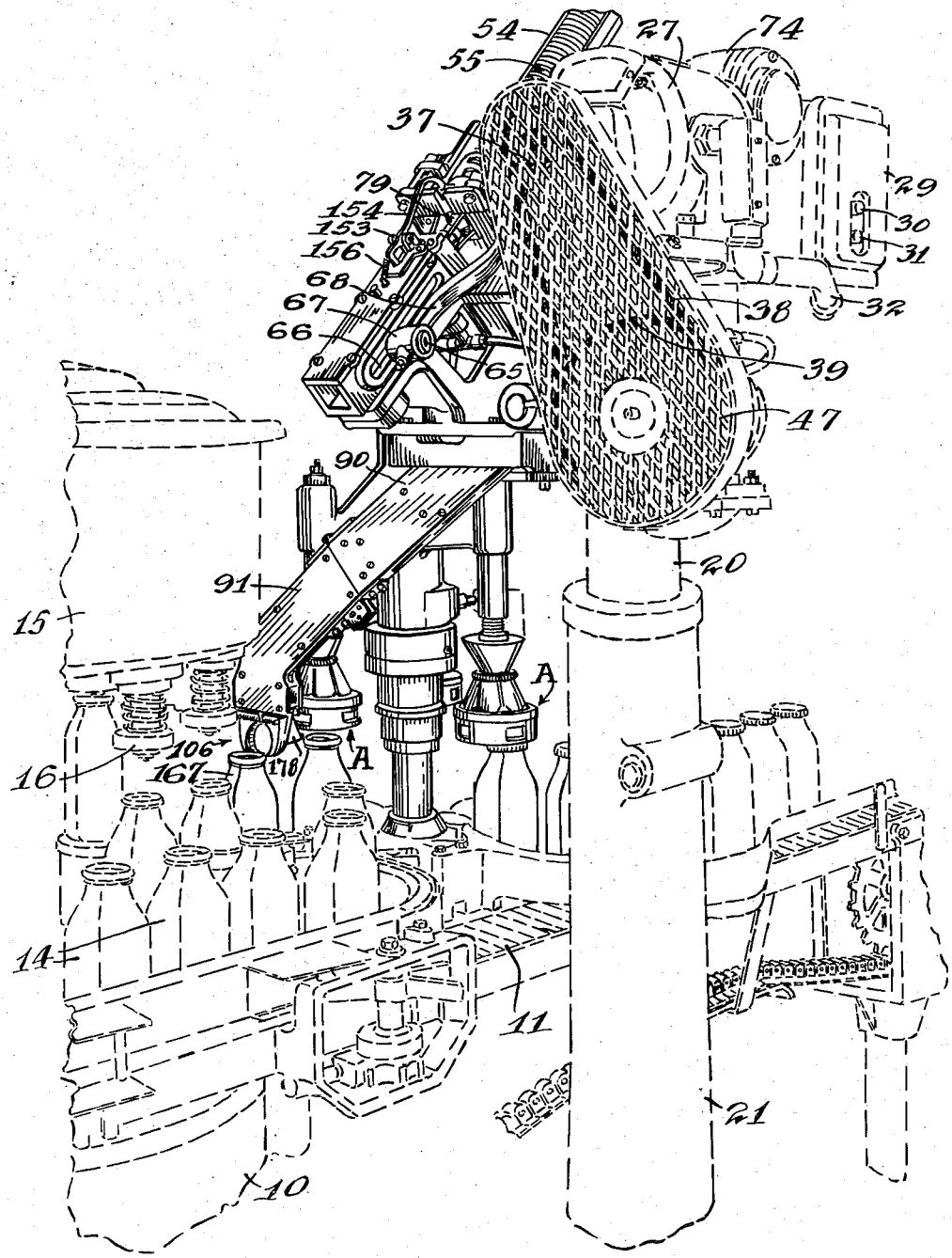
FIG-1-
INVENTORS
HENRY C. KONRAD; WILLY E. ZIMMERMANN
BY
Joseph B. Lindecker
ATTY.

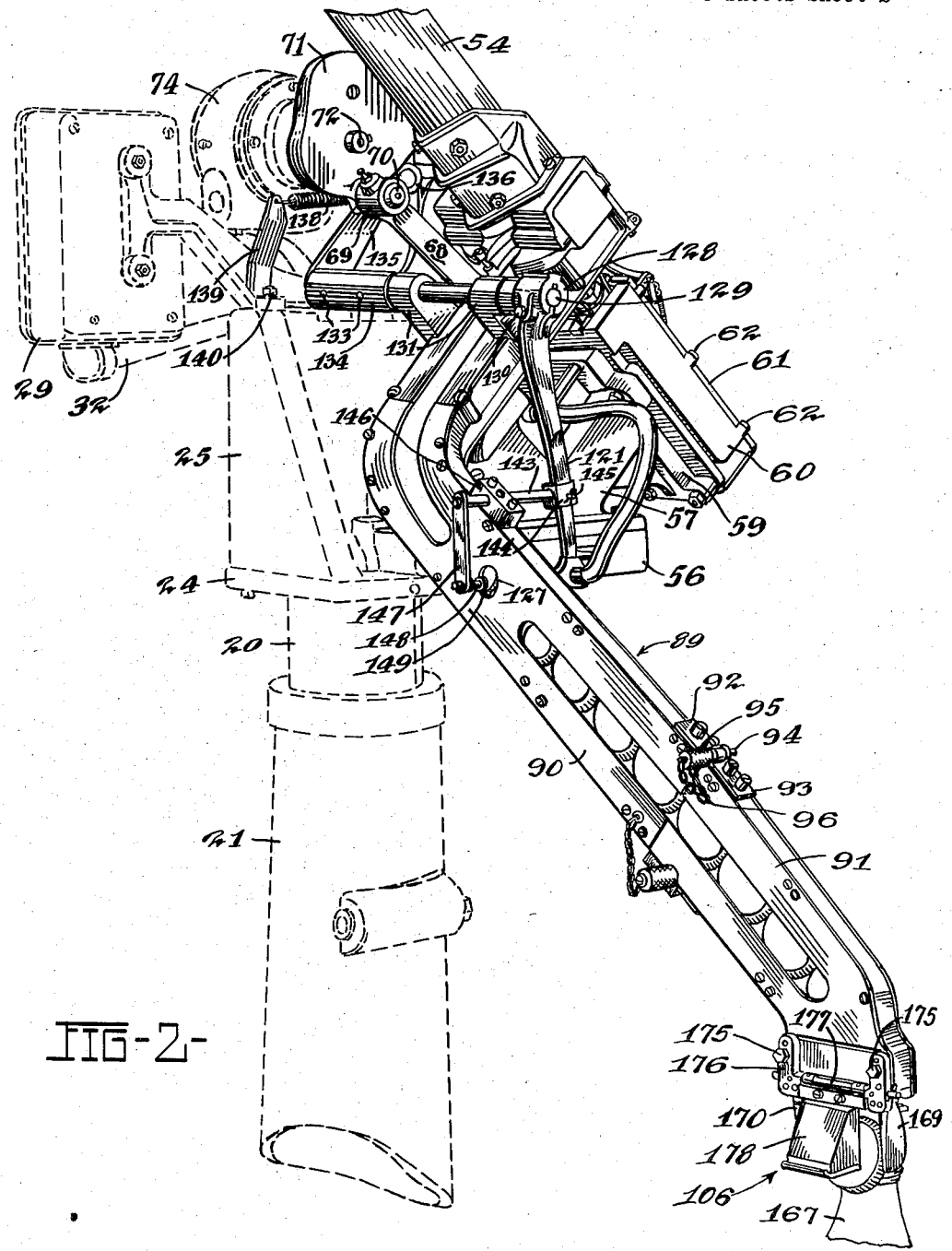

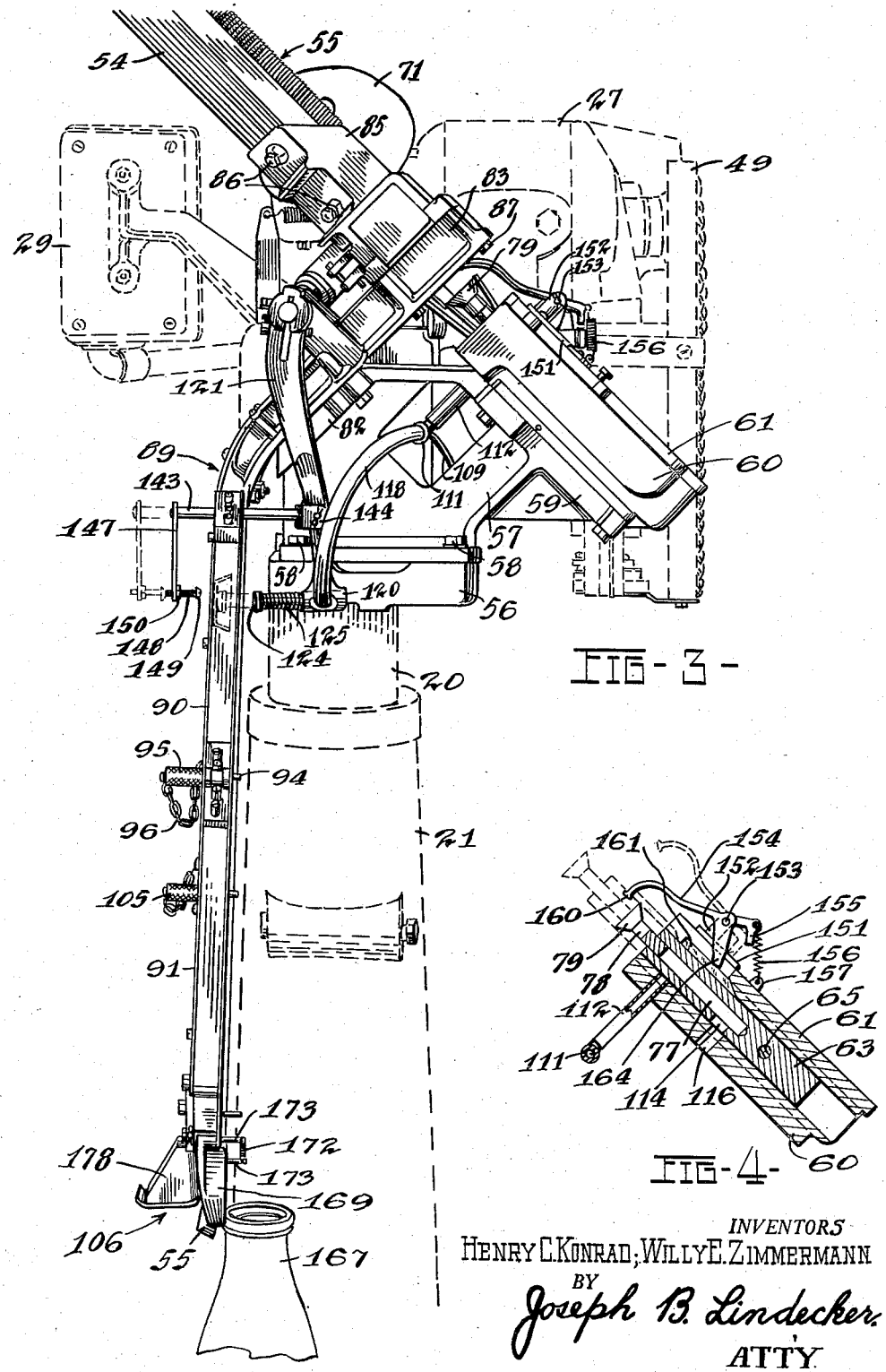

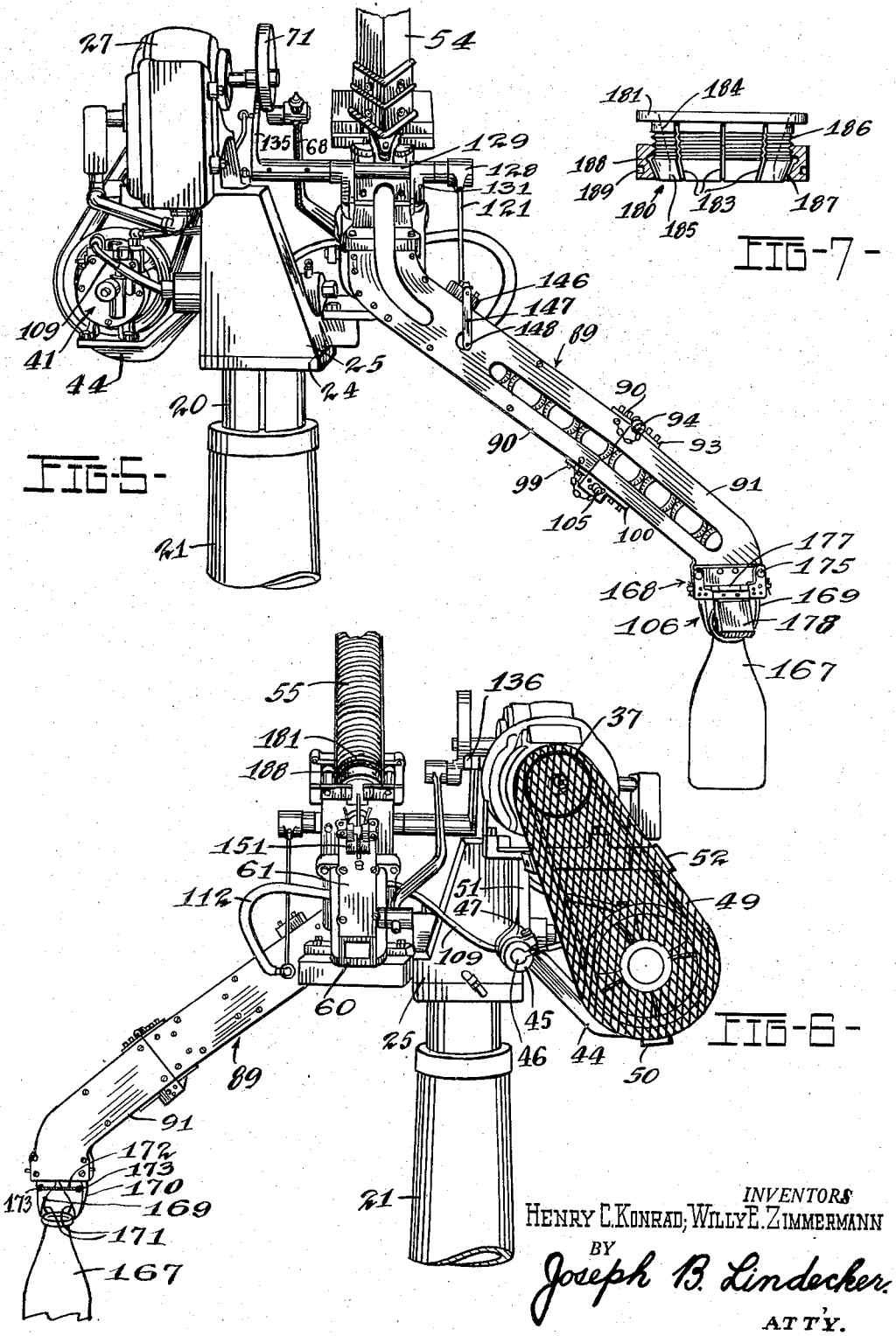

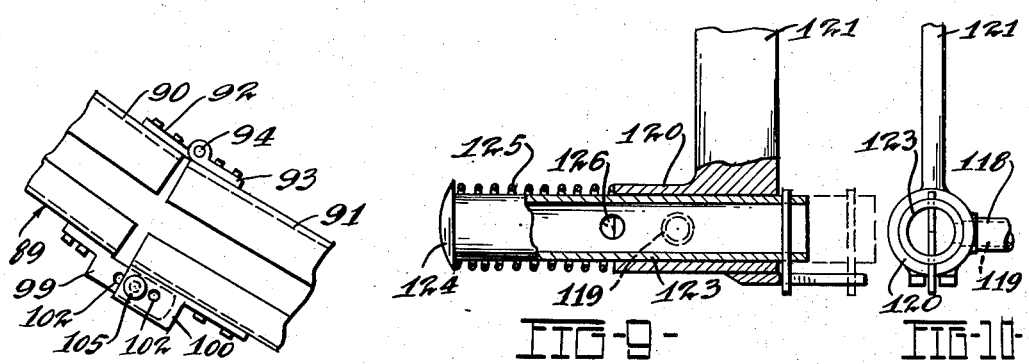
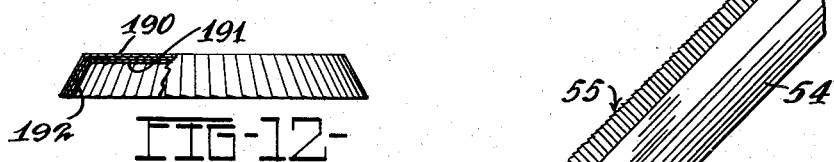
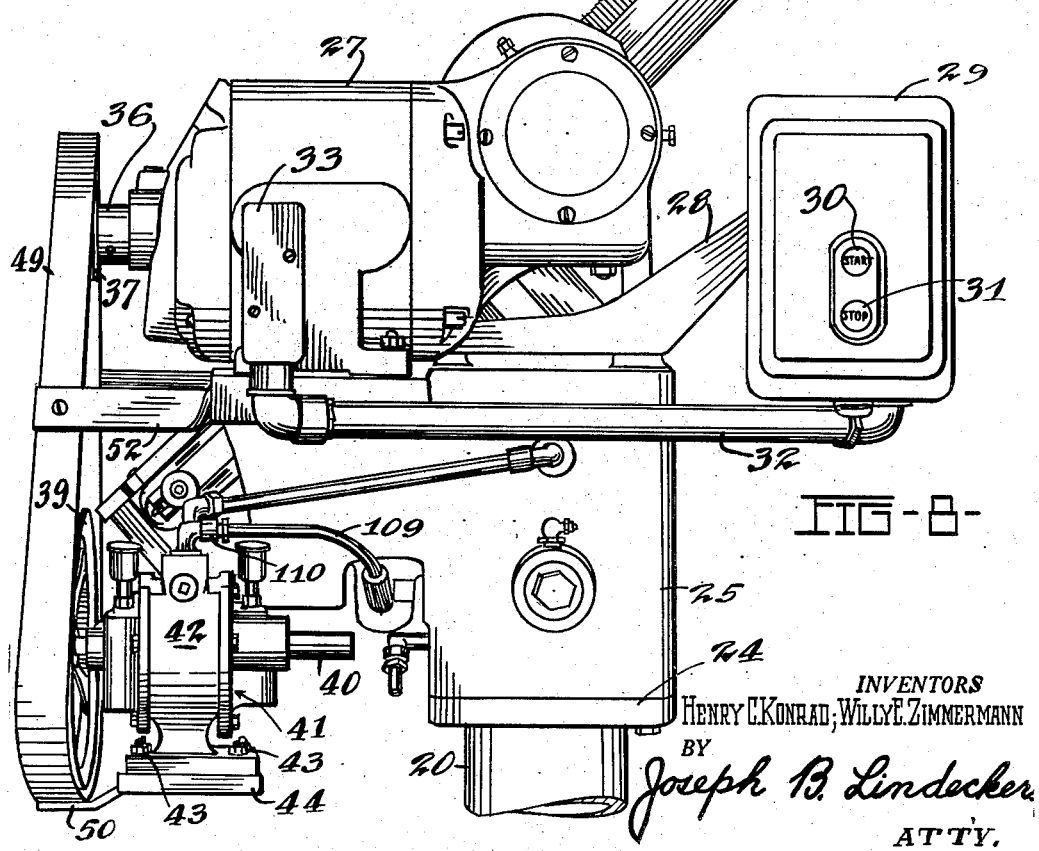

2,574,771

UNITED STATES PATENT OFFICE 2,574,771

CLOSURE FEEDING AND APPLYING MECHANISM

Willy E. Zimmermann, Chicago, and Henry C. Konrad, Lake Bluff, Ill., assignors to Standard Cap and Seal Corporation, Chicago, Ill., a corporation of Virginia Application December 21, 1945, Serial No. 636,378

14 Claims. (Cl. 226—88.1)

1

This invention relates to mechanisms for feeding and serving or delivering articles, and more especially to a means for delivering closures to a station where the same are applied to containers.

The invention comprehends the provision of apparatus or mechanisms for selectively serving caps or closures to a station from whence they are discharged on to containers for example, milk bottles wherein the process of feeding and applying the closures to the containers is completely automatic.

The invention contemplates a mechanism of this character in which the presence of a closure or pre-determined number of closures in a serving or delivery chute will temporarily impede the feeding of additional closures to the chute pending the disposition of one or more of the closures from the applying station.

An object of the invention resides in the provision of a machine incorporating an adjustable closure delivery chute section whereby the position of the closure discharge or applying station associated with the chute may be rendered adaptable to deliver caps or closures to various types and sizes of containers.

Another object of the invention is the provision of means for selectively separating and transferring closures from a nest or supply thereof to a delivery chute which conveys them to an applying station.

A further object of the invention resides in the provision of means for feeding flexible skirted closures to a delivery chute which is so arranged that the closures move in the chute supported upon the skirted portions thereof thus facilitating the conveyance of the closures to a discharge station.

A further object resides in the provision of means for conveying skirted caps or closures to an applying or discharge station whereby the closures are supported through walls of the skirted portions so that a coating or impregnation of wax or other non-hardening material upon the caps will not cohere to the walls of the conveying means.

A further object of the invention resides in the provision of simple yet effective means for extracting the lowermost closure from a supply or nest of closures and delivering the selected closure into a serving chute, said means operating in conjunction with means for distorting the lowermost closure whereby the tendency of the closures to cohere together by reason of wax or other coating upon the closures is reduced to a minimum.

2

Still another object of the invention is the provision of improved means associated with the closure applying station for efficiently and resiliently delivering a closure or cap upon a receptacle as the latter passes the closure applying station.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention which may be preferred, in which:

Figure 1 is a perspective view illustrating the arrangement of our invention as utilized for applying closures to milk bottles or the like;

Figure 2 is a perspective view taken from the delivery chute side of the machine;

Figure 3 is a front elevational view of the machine of our invention;

Figure 4 is a fragmentary detail sectional view showing certain elements forming part of the invention;

Figure 5 is a side elevational view of the machine;

Figure 6 is a view of the opposite side of the machine to that shown in Figure 5;

Figure 7 is a detail sectional view illustrating certain elements forming part of the invention;

Figure 8 is an enlarged view of the upper portion of the machine;

Figure 9 is an enlarged fragmentary detail elevational view illustrating one of the elements of the invention;

Figure 10 is an end view of the arrangement illustrated in Figure 9;

Figure 11 is a fragmentary detail elevational view illustrating an adjusting means for a closure delivery chute section, and Figure 12 is an elevational view partly in section showing a typical cap or closure of the character especially adapted for use with our invention.

While we have illustrated the embodiment of our invention as incorporated in a mechanism especially adapted for use in feeding, conveying and applying skirted caps or closures, which may be fabricated of paper, fiber, metal foil or a composite closure formed of such materials, to milk bottles or other containers, it is to be understood that we contemplate the utilization of our invention with any mechanism where it is desired to selectively or periodically deliver articles to an applying station.

While a form of our invention is illustrated as used in conjunction with a milk bottle conveying mechanism and bottle filling machine, the bottle conveying and filling mechanism forms no part of the invention per se and will only be described in such detail as to show the association of our invention therewith.

The bottle conveying mechanism includes a frame 10 upon which is mounted a flexible conveyor belt 11 which conveys or transports bottles 14 into a position to be filled with milk or other commodity from a receptacle or tank 15 through the medium of automatic commodity feeding devices or valves 16. After the bottles or containers have been filled, they are moved to a cap or closure applying station 106 at which point the closures are applied by the means of our invention to be hereinafter described in detail. The filled bottles, after receiving the skirted closures or caps are moved to a position wherein the sealing heads A are applied to the tops of the capped bottles in order to distort or configurate the cap skirts into closed or sealing engagement with the bottle or receptacle mouths.

The arrangement of our invention is preferably fabricated as a portable and adjustable unitary structure which is adaptable and usable with various types and kinds of receptacle filling mechanisms. To this end the arrangement of our invention is mounted upon or supported by a tubular member or post 20 which is vertically slidable within a pedestal or frame member 21. The pedestal 21 and tubular member 20 are connected together by suitable gearing (not shown) similar in design and function to that disclosed in Patent 2,304,146 invention of C. H. Brinton, granted on December 8, 1942. This gearing is for the purpose of elevating or lowering the tubular member or post 20 and mechanism carried thereby relative to the pedestal or frame member 21, the gearing being operated by the application of a hand crank (not shown). The post or member 20 is provided at its upper end with a platform or uniplanar portion 24 to which is secured a supplemental hollow or box-like frame 25. Supported upon the frame member 24 is an electrically actuated motor 27 or other suitable power means for operating the various components and mechanisms.

Secured upon the upper portion of the frame member 25 is a bracket 28 which carries at its outer extremity a box-like housing 29 which encloses switching mechanism (not shown) for controlling the operation of the motor 27. The switch box 29 supports a "starting" button 30 and a "stop" button 31 for completing and breaking the motor circuit. A metal conduit 32 connects the switch box 29 with a junction box 33, the conduit and box 33 containing wiring completing the motor circuit. A current supply cable (not shown) is connected to the switch box 29.

The motor 27 is provided with a shaft 33 which projects exteriorly of the motor casing and is provided with a driving pulley 37. The pulley 37 is connected by means of a belt 38 with a pulley 39 mounted upon a shaft 40 which forms a part of a vacuum pump 41. As the vacuum pump or suction producing means 41 is of conventional construction the details have not been illustrated. The vacuum pump 41 is inclusive of a housing 42 which is secured by means of bolts 43 to a bracket or arm 44, the latter being provided with a split boss portion 45 which is bored to receive a pin or stub shaft 46 carried by the frame member 25. The box portion 25 is securely clamped into engagement with shaft 46 by means of a clamping bolt 47. A grill-like guard or shield 49 is provided for enclosing the pulleys 37, 39 and the belt 38. The guard is secured to the arm 44 by means of a bracket 50, and to an arm 51 mounted upon the stub shaft 46 by means of a bracket 52.

Our arrangement is inclusive of means for supporting a plurality of nested articles or closures and is inclusive of a magazine 54 of trough-like configuration containing a supply of skirted caps or closures 55. The platform 24 of the machine frame is provided with an extension 56 upon which is fixedly mounted a bracket or member 57 which is held in place by means of bolts 58. The bracket 57 is formed with an angularly arranged pad portion 59 to which is secured a housing or enclosure 60. A cover plate 61 is secured to housing 60 by means of screws 62. The housing 60 has a hollow interior, which with plate 61 forms a rectangular closed section serving as a guide for a reciprocable plunger or member 63 mounted therein. The member 63 is provided with a laterally extending pin or stub shaft 65 which projects through a longitudinally extending slot 66 formed in the side wall of the housing 60, the projecting portion of the pin 65 being adapted to receive a hollow boss portion 67 formed as an integral extremity of a pitman or connecting rod 68, the opposite end of which is provided with a similar hollow boss portion 69 adapted to fit over a journal pin 70 carried by a cam or cam disc 71, the latter being fixedly mounted upon a shaft 72. The housing end plate 73 of the motor 27 is formed with an extension or housing 74 within which is journaled the cam carrying shaft 72 and reduction gearing (not shown) driven by the motor 27 for rotating the cam 71 at a greatly reduced speed as compared with that of the motor shaft 36.

The slidable member 63 is formed with a longitudinal bore or chamber 77 and projecting into the upper end of the bore is a metal tube 78 upon which is mounted an outwardly flaring cup or member 79 formed of rubber or other suitable flexible material. The slidable member 63 moves the cup 79 into engagement or contact with the lowermost closure in the magazine 54 to transfer the closure to a different position utilizing a vacuum or sub-atmospheric pressure as a securing medium.

The bracket 57 is provided with a second pad portion 82 which supports a member 83 of a hollow configuration, the hollow member or closure 83 having a chamber directly beneath and in alignment with the terminus of the closure supporting magazine 54. The magazine 54 is supported by means of a bracket 85 being secured thereto by means of screws 86 the bracket 85 being secured to the hollow member 83 by means of securing bolts 87 as shown in Figure 3. The member 83 is formed at the upper end of a closure delivery chute 89. The chute 89 is formed with an angularly depending portion 90 to the lower extremity of which is removably secured a chute extension 91. The chute portions 90 and 91 as shown in Figure 2 are provided with hinge plates 92 and 93 having interengaging or overlapping portions arranged to receive a pivot or hinge pin 94 having a finger grip portion 95 to facilitate removal and re-assembly of the pin 94 with the hinge plates 92 and 93. A flexible member or chain 96 is connected to the grip portion 95 and to the chute portion 90 to prevent loss of the pin 94 when the same is disconnected from the hinge or connecting plates.

Secured to the lower adjacent walls of chute sections 90 and 91 are plates 99 and 100 which are provided with over-lapping portions as shown in Figure 11. The overlapping portions of the plates 99 and 100 are each provided with a pair of openings 102, and which are adapted for selective alignment to receive a securing or positioning pin 105 as shown in Figures 5 and 11. The purposes of the series of aligned openings in the over-lapping portion is to provide for an adjustment of the chute portion 91 so that the position of the closure applying station 106 may be varied or changed to accommodate various sizes of milk bottles or other receptacles. The milk bottles being of different sizes occupy a relatively different position on their supporting means as they are moved from the filling machine shown in Figure 1 to the cap applying station 106. By selecting the proper pair of openings and inserting the pin 105 in the over-lapping portions of members 99 and 100 the cap applying station 106 at the terminus of the chute extension 91 may be shifted laterally into three different positions. Thus when the arrangement of our invention is used to cap bottles of different capacities, such as half-pints, pints and quarts, the pin 105 may be inserted in the proper set of aligned openings to position the cap applying station 106 in the proper relationship to the size of milk bottles being capped to insure that the closure or cap will be properly applied to the bottle mouths.

It should be noted that the chute is arranged to accommodate the skirted caps with the plane of the cap crowns disposed in a vertical position so that the caps or closures move downwardly in the chute being supported by the exterior walls of the cap skirt portions.

Our invention includes means whereby the caps are moved from the magazine 54 into the hollow member 83 thence into the delivery chute by combined mechanical and vacuum means. The tube 109 constituting the inlet for the vacuum pump 41 is connected to the pump by means of the fitting 110 as shown in Figure 8, and is joined at its opposite end to a T-shaped fitting 111 shown in Figures 3 and 4. The fitting 111 communicates with and is supported by a tube 112 extending into an opening in the lower portion of the housing 60 as shown in Figure 4. As particularly shown in Figure 4, the slidable member 63 is provided with an opening 114 which is adapted, when member 63 is at its uppermost position as indicated in dotted lines, to register with the tube 112 so as to establish communication between the bore 77 and tube 112. The lower wall of the housing 60 is provided with a passage or vent 116 open to the atmosphere and with which opening 114 establishes communication when the member is in the position shown in full lines in Figure 4.

The tube 118, connected at one end to the T-shaped fitting 111, has its opposite end joined to a short metal tube or fitting 119 which extends through an opening in a boss portion 120 formed upon the lower extremity of an arm or member 121 as shown in Figures 3 and 10. The boss 120 has a hollow cylindrical interior and slidably mounted within the hollow interior of boss 120 is a sleeve or hollow valve member 123 which is closed at one end by means of a head 124 of larger diameter than that of the sleeve 123. Surrounding the sleeve 123 and disposed between boss 120 and the head 124 is an expansive coil spring 125 which functions to normally maintain the sleeve 123 in the relative position shown in full lines in Figures 3 and 9. As will be seen in Figure 9, a wall of the sleeve 123 is provided with a vent opening 126 which is adapted, when the sleeve 123 is moved to the dotted line position, to register with the tube 118 so as to permit the flow of air into the tube 118 for the purposes of "breaking" the vacuum which normally exists in tubes 109, 112 and 118 under the influence of the vacuum pump when the latter is in operation.

The outlet 115 of the vacuum pump leads into the hollow frame portion 25 so that any oil entrained in the air stream because of suction acting on the lubricated surfaces of the reciprocating element 63 will be ejected into the frame portion 25.

The arm 121 is formed at its upper end with a boss portion 128 which is bored to fit over the end of a shaft 129 and is arranged to be clamped thereto by means of a locking bolt 130. The shaft 129 is journaled upon two upwardly extending projections 131 formed upon the member 83. Fixedly mounted upon the opposite end portion of the shaft 129 by means of pins 133 is a cylindrical member 134 provided with an upwardly extending arm 135 provided at its end portion with a stub shaft upon which is journaled a cam follower or roller 136, as shown in Figures 2 and 6, which is disposed in the path of the cam contour formed peripherally on cam disc 71. Means are provided for urging the cam follower 136 into engagement with the cam 71 comprising contractil coil spring 138 which is connected to an arm or bracket 139 secured to the housing 25 by means of a bolt 140.

A rod 143 having a bifurcated end portion 144 straddles the connecting rod 121 and is pivotally connected thereto by means of a pin 145. The shaft 143 extends through a suitable guiding means or block 146 which is bored to slidably accommodate the shaft, the block being secured to the top wall of the section 90 of the closure delivery chute 89. The opposite end of the shaft 143 is provided with a depending arm 147 fixedly secured to the shaft by suitable means so as to move laterally with the shaft. The lower extremity of the arm 147 is formed with a threaded opening adapted to receive a screw 148 having a pad or head portion 149, the screw 148 being adjustable in the arm 147 and is adapted to be retained in adjusted position by means of a locking nut 150. The side wall of the chute section 90 is provided with an opening 127 arranged so that the head 149 of screw 148 may pass therethrough for the purposes of loosening or freeing a cap that may adhere to the side wall of the chute section resulting from pressure exerted upon the cap by the head 124.

As will be hereinafter explained in connection with the operation of the machine, the closures 55 in the magazine are selectively removed therefrom by vacuum or sub-atmospheric pressure existing within the rubber cup 79 when the latter is brought into engagement with the lowermost closure in the magazine by mechanical means. Each closure is selectively extracted and moved into the hollow member 83, and means is provided for striking the closure to aid in removing the same into the delivery chute. To this end, the housing cover 61, shown in Figures 3 and 4, is provided with a plate 151 formed with upwardly extending projections 152 provided at their upper portions with aligned openings arranged to receive and accommodate a pin 153. Journaled or fulcrumed upon pin 153 is a lever member or arm 154. The short arm of the lever terminates in a depending portion 155 which acts as a stop means for limiting the pivotal movement of the member 154 in one direction of movement as indicated in dotted lines in Figure 4. The member 154 is normally held in the dotted line position as indicated in Figure 4 by means of a coil spring 156 which connects the end of member 154 with a projection 157 formed on the housing cover plate 61. The extremity of the long arm of the lever is formed with a head or pad portion 160 which is arranged to engage a closure as hereinafter explained.

The slidable member or plunger 63 is formed with a longitudinally extending raised portion or cam 161 which upon movement of member 63 toward its lowermost position engages a projection or finger 164 formed integrally with the lever or arm 154. Engagement of cam 161 with the finger 164 moves the arm 154 about its pivotal support 153 to the position shown in full lines in Figure 4. If the vacuum is effective in cup 79 to extract a closure from the magazine 54, and such extracted closure is transferred by cup 79 to the chamber in member 83, the vacuum within the cup 79 and bore 77 is relieved by registration of opening 114 in member 63 with the vent 116 open to the atmosphere, the arm 154 strikes or impinges upon the extracted closure in the hollow portion 83 to move the closure laterally into the delivery chute 89.

The means for effecting the proper application of a skirted cap or closure from the delivery chute 89 to the mouth of a bottle 167, sometimes referred to as a cap applying station, is particularly illustrated in Figures 2, 3, 5, and 6. The closure discharge or serving outlet 168 is slightly enlarged over the normal depth of the delivery chute, and the side walls thereof pivotally support the wing-like members 169 and 170, each having curved portions 171 which are arranged to engage or contact the mouth portion of a bottle 167 as the same passes the cap applying outlet or station. The wing-like members or curved fingers 169 and 170 are preferably held in their innermost position by means of a contractil spring 172, the ends of which are suitably secured to posts 173 formed on each wing-like member. The spring 172 functions to urge the members 169 and 170 to contact with the skirt of the container closure, but the mounting permits the release of a closure when the same is engaged by a bottle or container moving through the cap applying station. Secured to the lower extremity of the delivery chute section 91 by means of bolts 175 is a bracket 176 supporting a shaft 177 upon which is pivotally mounted a closure or cap leveling means or member 178. In the embodiment illustrated, as will be seen from the examination of Figure 3, the cap leveling or positioning member 178 is of triangular shape in cross section so that the center of gravity of member 178 is spaced vertically from a vertical plane through the pivot shaft 177. By this arrangement member 177 is urged into engagement with the closure in the mouth of the outlet in position to be placed upon a container mouth so that when the bottle 167 contacts the closure in the cap applying station 106 as shown in Figures 1 and 3, the member 178 will continue to engage the closure as it moves under the same and upon the bottle mouth so that the closure will be fitted properly upon the same. The swinging movement of member 177 toward the closure in the cap applying station or outlet in the delivery chute is limited by an abutment or suitable means (not shown) which serves to prevent the member 178 from dislodging the lowermost closure in the delivery chute before a bottle is in position to remove a closure.

Figure 12 illustrates a form of flexible closure or cap especially configurated to be placed upon a milk bottle mouth. This type of cap is formed of inner and outer layers of paper designated 190 and 191 between which is disposed a layer of thin metal foil 192. The inner and outer layers of paper are usually coated with wax or other suitable waterproof non-drying coating, the wax interior surface of the closures serving to form an effective seal for the bottle mouths. The presence of wax or other protective coating upon the closures causes adjacent closures in nested relationship to tend to adhere to one another. Our arrangement of mechanism embodies a means for distorting the closures as they pass downwardly through the outlet of the magazine 54. This means is inclusive of a hollow member 180 having a flange portion 181 and a body portion which is formed with a plurality of radially disposed kerfs or slots 183, which construction simulates a collet formation. The interior wall of the member 180 is of tapered configuration 184 terminating in a cylindrical mouth or outlet 185, and the exterior wall of member 180 being formed with a threaded portion 186. The lower extremity of the member 189 has a tapered exterior wall 187. Threaded upon portion 186 is an adjusting collar 188 having a reciprocally tapered surface arranged to engage the tapered surface 187 of member 180. The adjusting collar 188 is formed with recesses 189 adapted to receive a spanner wrench (not shown) for the purpose of adjusting the collar axially of the member 180. Such longitudinal adjustment provides a means for increasing or decreasing the effective interior diameter of wall 185 of member 180. Thus when the lowermost of the closures 54 move downwardly into the tapered interior portion 184 of member 180 during a closure extracting operation carried on by means of the reciprocable member 63, cup 79 and sub-atmospheric pressures the skirt wall of the lowermost closure is distorted toward the longitudinal axis of the member 180 causing a slight curvature or distortion of the crown portion of the closure which effectively breaks or eliminates adhesion between waxed surfaces of adjacent caps or closures and separates the cap being extracted from its next adjacent cap in the magazine. Thus only one cap is withdrawn at each extractive movement of member 63. The collar 188 is adjustable axially with respect to the collet-like member 180 to obtain just sufficient distortion of the closure or cap configuration to effect a separation of the closures.

The operation of the arrangement of our invention is as follows: The magazine 54 is first filled with a supply of nested skirted closures or caps 55, and the starting button 30 in switch box 29 depressed, completing the motor circuit thus energizing the electric motor 27. This operation initiates the rotation of the cam 71 through the gearing contained within the gear box 74 and at the same time, operation of the suction means or pump 41 is begun. Rotation of the cam 71 actuates the pitman 68 which is connected to the member 63 whereby the latter is reciprocated longitudinally in the housing 60.

During the reciprocation of member 63, the vacuum pump 41 being in operation, a suction or sub-atmospheric pressure is established in the tubes 109, 112 and 118 so as to impress sub-atmospheric pressure in the bore 77 in member 63 and in the interior of the flexible rubber closure-engaging cup 79. It should be noted with particular reference to Figure 9, that the vent 126 in the sleeve 123 is out of registration with tube 118 so that air under atmospheric pressure will not normally be admitted to tube 118 through vent 126. Thus, until the cap 79 is in engagement with the lowermost closure in the magazine 54 air is admitted through the flared open end of the cup 79 under the influence of the suction pump 41.

At the instant the flared open end of the flexible cup 79 engages the interior surface of the crown portion of the lowermost closure in the magazine 54, the closure acts as a valve to interrupt the flow of air into the cup 79, so that the pressure within the cup and its connecting passageways is reduced below atmospheric pressure under the influence of the suction pump 41, causing the said closure to adhere to the cup 79. Continued rotation of cam 71 causes a downward slidable movement of member 63 and cup 79, carrying the lowermost closure through collet member 180 into the hollow portion or chamber 83. As the closure moves through the collet 180, the skirted portions of the closure or cap are distorted inwardly to break or disrupt any adhesion of the waxed interior and exterior surfaces of adjacent caps so that only the single lowermost closure in the magazine is withdrawn by the cup 79 during a single cycle of reciprocation of the member 63.

When the cup 79 reaches a position in its downward travel such that the lower edges of the skirted portion of the closure engages the inner base surface of the chamber in portion 83, the vent opening 114 in member 63 has reached a point of registration with passage 116 to the atmosphere to admit atmospheric air under atmospheric pressure to the interior of the cup 79 and passages associated therewith. The restoration of atmospheric pressure in cup 79 immediately releases the closure in the hollow member 83, and further slidable movement of member 63 downwardly moves the cup 79 to the position shown in full lines in Figure 3, out of the path of subsequent movement of the extracted or withdrawn closure. As the member 63 approaches the end of the downward phase of its movement, the land or raised portion 161 engages the finger 164 causing the pad portion 160 on lever 164 to move to the position indicated in full lines in Figure 4 whereby the pad portion 160 impinges or strikes the extracted closure resting in the chamber in member 83 to initiate downward movement of the closure into the delivery chute 89. The delivery chute is of such configuration that the skirted caps roll downwardly in the chute, the caps being supported upon the lower wall of the chute through the skirted portions. The first cap in the chute will be conveyed to the lowermost portion thereof i. e. the cap applying station 106 where the downward movement of the closure is impeded by the curved fingers 169 and 170 pivoted to the extremity of the closure delivery chute section 91.

With each rotation of the cam 71 the member 63 will be reciprocated to withdraw or extract a closure from the nest of closure 55 in the magazine, and this action continues whereby the closures are selectively and successively fed into the delivery chute 89 until a number of closures as indicated in Figures 2 and 5 are disposed therein.

It should be noted that at each revolution of the cam 71 the arm 121 is oscillated by reason of the cam roller or follower 136 engaging a proper configurating lobe 75 upon the cam 71 to cause rotation of shaft 129 and hence oscillation of arm 121. The lobe configuration on cam 71 is of such contour as to move the pad or head portion 124 carried by sleeve 123 through an opening in the side wall of the chute section 127. As long as the delivery chute 89 is not filled with caps to a point where a cap will obstruct the opening in the chute in alignment with the head portion 124, closures or caps will continue to be delivered into the chute 89 as hereinbefore described. However, when the chute 89 contains a predetermined number of caps whereby a cap is disposed over opening 127 in the chute as shown in dotted lines in Figure 3, the oscillation of arm 121 in its usual cycle brings the head or pad portion 124 formed on sleeve 123 into engagement with the interior of the crown of a closure or cap, the same acting as a temporary abutment to momentarily stop the movement of sleeve 123. When said pad 124 presses against a closure, it presses the exterior surface of the central part of the closure against the vertical side wall of the chute, releasing the skirt portion of the closure from contacting the opposite vertical side of the chute. As the arm 121 continues a slight distance in a right hand direction as viewed in Figure 3 after the pad 124 engages the interior of a closure in a chute, the spring 125 will be compressed, and the sleeve 123 will move inwardly in the boss portion 120 formed upon the lower end of arm 21 bringing the vent opening 126 into registration with the fitting 119 connecting the tube 118 with the boss 120 to admit atmospheric air into the tubes 118, 112 and 109 and bore 77 as well as the interior of cup 79 to prevent the existence of sub-atmospheric pressure in cup 79. Thus with normal atmospheric pressure in cup 79, continued reciprocation of member 63 will merely bring cup 79 into engagement with a lowermost closure in the magazine 54, and in the absence of suction or reduced pressure existing in cup 79, further extraction of closures from the magazine will be interrupted until the closure in the chute 89, lying in the path of lateral movement of pad 24, is moved downwardly, no further feeding of closures from the magazine into the delivery chute will take place.

The head 149 of screw 148, carried by arm 147 and reciprocated by arm 121 through the medium of shaft 143, moves into the opening 127 in the side wall of the chute and slightly engages the exterior surface of the crown of the closure for the purpose of loosening the said abutment closure to prevent same from adhering to the side wall of the delivery chute under the pressure of the head 124. By this means the closure acting as a temporary abutment, will be in a loosened condition to move downwardly upon the removal of further closures from the chute at the closure applying station.

After the bottles or containers are filled with milk or other commodity from the tank 15, they are consecutively conveyed past the cap applying station as shown in the drawings and particularly Figure 1. As a filled bottle 167 reaches the cap applying station 106 the bottle mouth or lip engages the closure as shown in Figures 2 and 3, and as the bottle passes between the resiliently retained fingers 169 and 170, the closure disposed in applying position is released and the leveling plate 177 directs the closure on to the bottle mouth during movement of the bottle through the cap applying station. As soon as a closure is withdrawn from the chute at the cap applying station, the closure disposed in alignment with the opening 127 in the delivery chute moves downwardly, so that upon the next oscillatory movement of arm 121 under the influence of the rotating cam 71, the pad 124 will not engage a closure in the chute so that sub-atmospheric pressure or suction will be impressed in the bore 77 in member 63 and in the interior of cup 79. Thus when the cup 79 engages a lowermost cap in magazine 54, the cap will be caused to adhere, by suction, to the cup and will be extracted from the closure supply and moved into the delivery chute in the manner hereinbefore explained.

Due to the difference in sizes of containers, as for example, quarts, pints and half pints, the bottles in moving to cap applying position acquire a slightly different relative position by reason of the difference in diameters of the bottles. In order to assure that the various sizes of bottles or containers will pass the cap applying station in proper relation thereto, section 91 of the closure delivery chute may be adjusted by positioning the pin 105 in the proper openings of the overlapping portions of member 99 and 100 so that the chute section 91 pivots about the pin 94 as particularly shown in Figures 2 and 11.

It will be seen from the foregoing that we have provided a closure feeding and applying mechanism which is simple, yet effective and entirely automatic in its operation, and is particularly adaptable for supplying short skirted caps to bottles without injuring the skirted portions of the caps and yet assuring that the caps will be successively moved to the applying station by reliable means.

It is apparent that, within the scope of the invention, modifications and different arrangements may be made other than is herein disclosed, and the present disclosure is illustrative merely, the invention comprehending all variations thereof.

What we claim is:

1. In combination, a frame; a closure retaining means supported by said frame; said retaining means adapted to temporarily hold a plurality of closures to be delivered; a receiving chute connected to said receiving means and inclined from the horizontal; said chute being of such size and position to support said closures in a vertical plane; said chute having a single serving outlet; closure engaging means including a relatively movable hollow member adjacent to said retaining means; a line carrying sub-atmospheric air connected to said hollow member; a positive mechanical mechanism for moving said closure engaging means into extracting engagement with one closure from said closure retaining means and transporting said closure to said receiving chute; positive mechanical means operable to release said closure from said engaging means to deposit the same into the top portion of said receiving chute so that it will roll downwardly therein; means controlled by the presence of a predetermined number of closures in said chute for rendering said closure engaging and withdrawing means ineffective; said means including a mechanically driven oscillating arm carrying a hollow boss at its lower end, said boss having a hollow plunger slidably mounted therein, said hollow plunger closed at one end by a solid head portion, a coil type compression spring mounted between said boss and said head to resiliently maintain said plunger head away from said boss, a stop pin inserted in said plunger at the open end thereof, said plunger open to the atmosphere at its opposite end, a port opening in the side wall of said boss into which a sub-atmospheric air line is attached; a port opening in the side wall of said hollow plunger to admit atmospheric air to said port in said boss, an opening in each side of the delivery chute so that said plunger head may pass therethrough as said arm oscillates, said plunger head adapted to engage the interior of the crown of one of the latest extracted closures in the delivery chute to stop the substantially horizontal movement of said plunger whenever a closure in the delivery chute is in its path of travel horizontally through said chute as said arm oscillates, by the interruption of the travel of said plunger said port opening combined with said plunger is operated to admit air into said port opening in said boss and into the line carrying sub-atmospheric pressure to said closure engaging means to control the extraction of caps from said magazine and said oscillating arm supporting an auxiliary arm intermediate its ends which supports a head member in line with and extending towards said plunger carried by said boss, said head member adapted to contact the external crown portion of any closure obstructing its path of travel as it passes through one of the openings in the delivery chute, said head member adapted to move said closure away from the side of said delivery chute so that it may drop downwardly into the lower portion of said chute.

2. In combination, a frame; a closure retaining means supported by said frame; said retaining means adapted to temporarily hold a plurality of closures to be delivered; a receiving chute connected to said receiving means and inclined from the horizontal; said chute being of such size and position to support said closures in a vertical plane; said chute having a single serving outlet; closure engaging means including a relatively movable hollow member adjacent to said retaining means; a line carrying sub-atmospheric air connected to said hollow member; a source of sub-atmospheric pressure including a continuous suction means; a positive mechanical mechanism for moving said closure engaging means into extracting engagement with one closure from said closure retaining means and transporting said closures to said receiving chute; a positive mechanical means operable to release said closure from said engaging means to deposit the same into the top portion of said receiving chute so that it will roll downwardly therein; means controlled by the presence of a predetermined number of closures in said chute for rendering said closure engaging and withdrawing means ineffective; said means including a mechanically driven oscillating arm carrying a hollow boss at its lower end, said boss having a hollow plunger slidably mounted therein, said hollow plunger closed at one end by a solid head portion, a coil type compression spring mounted between said boss and said head to resiliently maintain said plunger head away from said boss, a stop means inserted in said plunger at the open end thereof, said plunger open to the atmosphere at its opposite end, a port opening in the side wall of said boss into which sub-atmospheric air line is attached; a port opening in the side wall of said hollow plunger to admit atmospheric air to said port in said boss, an opening in each side of the delivery chute so that said plunger head may pass therethrough as said arm oscillates, said plunger head adapted to engage the interior of the crown of one of the latest extracted closures in the delivery chute thereby stopping the substantially horizontal movement of said plunger whenever a closure in the delivery chute is in its path of travel horizontally as it passes through said chute as said arm oscillates, no pressure being applied to the skirt portion of the closure, by the interruption of the travel of said plunger said port opening combined with said plunger is operated to admit air into said port opening in said boss and into the line carrying sub-atmospheric pressure to said closure engaging means to control the extraction of caps from said magazine, and said oscillating arm supporting an auxiliary arm intermediate its ends which supports a head member in line with and extending towards said plunger carried by said boss, said head member adapted to contact the external crown portion of any closure obstructing its path of travel as it passes through one of the openings in the delivery chute, said head member adapted to move said closure away from the side of said delivery chute so that it may drop downwardly into the lower portion of said chute.

3. In combination, a frame; closure retaining means supported by said frame; each retaining means adapted to temporarily hold a plurality of closures to be delivered; a receiving chute connected to said receiving means and inclined from the horizontal; said chute being of such size and position to support said closures in a vertical plane; said chute having a single serving outlet; closure engaging means including a relatively movable hollow member adjacent to said retaining means; a line carrying sub-atmospheric air connected to said hollow member; a positive mechanical mechanism for moving said closure engaging means into extracting engagement with one closure from said closure retaining means and transporting said closures to said receiving chute; a positive mechanical means operable to release said closure from said engaging means to deposit the same into the top portion of said receiving chute so that it will roll downwardly therein; means movable laterally through said chute controlled by the presence of a predetermined number of closures in said chute for rendering said closure engaging and withdrawing means ineffective; said means including a mechanically driven ocillating arm carrying a hollow bearing member at its lower end, said bearing member having a hollow plunger slidably mounted therein, said hollow plunger closed at one end by a solid head portion, a coil type compression spring mounted between said bearing member and said head to resiliently maintain said plunger head away from said bearing member, a stop means inserted in said plunger at the open end thereof, said plunger open to the atmosphere at its opposite end, a port opening in the side wall of said bearing member into which sub-atmospheric air line is attached; a port opening in the side wall of said hollow plunger to admit atmospheric air to said port in said bearing member, an opening in each side of the delivery chute so that said plunger head may pass therethrough as said arm oscillates, said plunger head adapted to engage the interior of the crown of one of the latest extracted closures in the delivery chute thereby stopping the substantially horizontal movement of said plunger whenever a closure in the delivery chute is in its path of travel horizontally through said chute as said arm oscillates and by the interruption of the travel of said plunger said port opening combined with said plunger is operated to admit air into said port opening in said boss and into the line carrying sub-atmospheric pressure to said closure engaging means to control the extraction of caps from said magazine.

4. In combination, a frame; a container closure delivery chute supported upon the frame; a magazine adapted to contain a supply of skirted closures; a relatively movable mechanical member; pneumatic means associated with said relatively movable member arranged to engage and transport said closures away from said magazine; means engageable with the withdrawn closure for ejecting same into the hollow upper portion of the delivery chute whereby each skirted closure will roll downwardly to the lower portion of the chute where the closure is supported by its skirt wall; a mechanically driven oscillating arm movable periodically into the path of said closures in said delivery chute; said arm carrying a hollow boss at its lower end, said boss having a hollow plunger slidably mounted therein, said hollow plunger closed at one end by a solid head portion, a coil type compression spring mounted between said boss and said head to resiliently maintain said plunger head away from said boss, a stop pin inserted in said plunger at the open end thereof, said plunger open to the atmosphere at its opposite end, a port opening in the side wall of said boss to which sub-atmospheric air line is attached; a port opening in the side wall of said hollow plunger to admit atmospheric air to said port in said boss, said arm being arranged whereby engagement thereof with the interior of a closure disposed in said chute renders said closure extracting means ineffective; said plunger arranged to move laterally and by the contacting of the plunger with the inside of said closure said ports will coincide to admit atmospheric air into the line of said pneumatic means associated with said mechanical member; an element movable into contact with the closure in said chute engaged by said periodically movable means for freeing said closure to pass downwardly in the chute; a closure applying station associated with the extremity of said delivery chute, and means to properly dispose the same upon a container.

5. In combination, a frame; a magazine supported upon the frame and adapted to contain a supply of skirted caps; a hollow enclosure inclined from the horizontal and disposed beneath the outlet of said magazine; a delivery chute for said caps connected to said frame and with said hollow member and inclined from the horizontal; a reciprocable mechanical member arranged for slidable movement with respect of said magazine; a pneumatic element associated with said reciprocable member and engagable upon reciprocation of said member with a lowermost cap in said magazine; means for impressing sub-atmospheric pressure to the interior of the cap engaging element whereby a lowermost skirted cap in said magazine is influenced by said suction and withdrawn by movement of said reciprocable mechanical member and deposited in said hollow enclosure; means including a movable arm for ejecting said caps from said hollow enclosure and cause them to slide downwardly upon their peripheral edges into said delivery chute; said delivery chute being configurated in cross section to support said caps with the crown portions in a substantially vertical plane whereby they will roll downwardly upon their peripheral skirt portion; said delivery chute including an adjustable section; a cap applying station associated with the adjustable section; means for adjusting said chute section whereby the cap applying station is shifted to accommodate different sizes of containers; means associated with the extremity of the adjustable chute section and actuated by a container to release a cap from said cap applying station; a mechanical driven means controlled by the presence of a predetermined number of skirted caps in said delivery chute for rendering said cap extracting means ineffective; said means including an oscillating arm carrying a hollow boss at its lower end, said boss having a hollow plunger slidably mounted therein; said hollow plunger closed at one end by a solid head portion, a coil type compression spring mounted between said boss and said head to resiliently maintain said plunger head away from said boss, a stop pin inserted in said plunger at the open end thereof, said plunger open to the atmosphere at its opposite end, a port opening in the side wall of said boss to which sub-atmospheric air line is attached; a port opening in the side wall of said hollow plunger to admit atmospheric air to said port in said boss; said plunger adapted to engage the interior of the crown of a closure to stop the movement of said plunger whenever a closure is in its path of travel, no pressure being applied to the skirt portion of said closure, and by the interruption of the travel of said plunger said port combined with said plunger is operated to admit atmospheric air into the line carrying sub-atmospheric pressure with said mechanical member and pneumatic element associated therewith.

6. In a device of the character disclosed, in combination, means for retaining a plurality of closures in a magazine; mechanical means for removing closures from said magazine whereby they may pass to a delivery chute; pneumatic means for rendering said mechanical means effective; a delivery chute in communication with the base portion of said magazine, means actuated by a predetermined number of closures in said chute for controlling the degree of sub-atmospheric pressure associated with said mechanical means and said pneumatic means, said means including a mechanically driven oscillating arm carrying a hollow boss at its lower end, said boss having a hollow plunger slidably mounted therein; said hollow plunger closed at one end by a solid head portion, a coil type compression spring mounted between said boss and said head to resiliently maintain said plunger head away from said boss, a stop pin inserted in said plunger at the open end thereof, said plunger open to the atmosphere at its opposite end, a port opening in the side wall of said boss to which sub-atmospheric air line is attached; a port opening in the side wall of said hollow plunger to admit atmospheric air to said port in said boss; said plunger with said head portion thereon arranged to move laterally thru the side of said chute for contacting the interior of the crown of a closure if present and positioned in a vertical plane within said chute and arranged to roll downwardly therein to the lower portion of said chute, whenever said plunger contacts a closure no pressure is applied to the skirt portion of said closure, and by the contacting of the plunger with a closure said port combined with said plunger is operated to admit atmospheric air into said port combined with said boss and the line of said pneumatic means carrying sub-atmospheric pressure to said mechanical means.

7. In a device of the character disclosed, in combination, means for retaining a plurality of closures; a closure engaging means including a flexible member; positive mechanical means for moving said closure engaging means including said flexible member into successive engagement with said closures; means utilizing continuously operative normally reduced pressure in cooperation with said flexible member for selectively transpositioning said closures to a delivery chute whereby said closures roll downwardly therein upon their peripheral edges in a substantially vertical plane; said chute connected to said receiving means and inclined from the horizontal; said chute being of such size and position to support said closures in a vertical plane; said chute having a single serving outlet; means controlled by a predetermined number of repositioned closures within said chute for periodically disconnecting said reduced pressure from said flexible member for rendering said article transpositioning means ineffective; said means including a mechanically driven oscillating arm carrying a hollow boss at its lower end; said boss having a hollow plunger slidably mounted therein; said hollow plunger closed at one end by a solid head portion; a coil type compression spring mounted between said boss and said head to resiliently maintain said plunger head away from said boss, a stop pin inserted in said plunger at the open end thereof, said plunger open to the atmosphere at its opposite end, a port opening in the side wall of said boss to which sub-atmospheric air line is attached; a port opening in the side wall of said hollow plunger to admit atmospheric air to said port in said boss; said plunger with said head portion thereon adapted to engage the interior of the crown of a closure to stop the movement of said plunger whenever a closure is in its path of travel, no pressure being applied to the skirt portion of said closure, and by the interruption of the travel of said plunger the port combined with said plunger is registered with the port in said boss to admit atmospheric air into the line carrying sub-atmospheric pressure to said closure transpositioning means, and said oscillating arm supporting an auxiliary arm intermediate its ends which supports a head member in line with and extending towards said plunger carried by said boss, said head member adapted to contact the external crown portion of any closure obstructing its path of travel as it passes through one of the openings in the delivery chute, said head member adapted to move said closure away from the side of said delivery chute so that it may drop downwardly into the lower portion of said chute.

8. In combination, a magazine adapted to retain and support a supply of skirted articles; a delivery chute; means including a relatively movable hollow member arranged to be periodically brought into engagement with the lowermost of the skirted articles in said magazine; means for impressing sub-atmospheric pressure in the hollow interior of said relatively movable member and effective in conjunction with said member for withdrawing an article from said magazine; means for directing withdrawn articles into the delivery chute; and a collet type means associated with the extremity of said article supporting magazine for temporarily distorting the article in position to be extracted from the magazine whereby the same is separated from the adjacent article; said collet including a hollow member with a body formed with a tapered surface, a plurality of radially disposed kerfs running lengthwise thereof, and with threads on the exterior of said body, and an adjusting collar having a tapered surface arranged to engage said tapered surface on said body.

9. In combination, a magazine adapted to retain and support a supply of skirted articles; a delivery chute inclined from the horizontal and arranged to receive articles from said magazine; said chute being of such size and position to support said articles in a vertical plane; means including a relatively movable hollow member arranged to be periodically brought into engagement with the lowermost of the skirted articles in said magazine; means for impressing sub-atmospheric pressure in the hollow interior of said relatively movable member and effective in conjunction with said member for successively withdrawing articles from said magazine; positive mechanical means for directing the withdrawn articles into the delivery chute so that they will roll downwardly therein; means controlled by the presence of a predetermined number of articles in said chute for rendering said article withdrawing means ineffective, and a collet type means associated with the extremity of said article supporting magazine for temporarily distorting the article in position to be extracted whereby the same is separated from the adjacent article said collet including a hollow body member with exterior threads, a tapered surface and a plurality of radially disposed slots running lengthwise thereof, and said body having an adjusting collar positioned thereon having a tapered surface arranged to engage the tapered surface on said body.

10. In combination, a magazine adapted to retain and support a supply of skirted closures; a chamber inclined with the horizontal adapted to receive articles from said magazine; a delivery chute inclined with the horizontal and connected with said chamber; means including a relatively movable hollow member arranged to be periodically brought into engagement with the lowermost of the skirted closures in said magazine; means for impressing sub-atmospheric pressure in the hollow interior of said relatively movable member and effective in conjunction with said member for withdrawing a closure from said magazine and disposing same in said chamber; mechanical means engagable with the withdrawn closure to cause it to slide laterally from said chamber into the delivery chute; said delivery chute of such size and position to support said closure in a vertical plane so it will roll downwardly in said chute; means associated with said discharge station for retaining closures in said chute; means controlled by the number of closures in said chute for rendering said closure withdrawing means ineffective; a collet type means associated with the extremity of said closure supporting magazine for temporarily distorting the closure in position to be extracted therefrom whereby the same is separated from the next succeeding closure; and means for adjusting the closure distorting means.

11. In combination, means including a magazine for supporting a plurality of caps; a delivery chute for said caps; a reciprocable member; a flexible hollow cap engaging element carried by said reciprocable member; means to impress sub-atmospheric pressure to the interior of said cap engaging element whereby engagement of the latter with a cap in the magazine extracts a cap therefrom under the influence of the sub-atmospheric pressure; means for reciprocating said member for transferring the extracted caps to a different position; a pivotally supported arm; means on said arm engagable with said reciprocable member whereby said arm impinges upon the transferred caps to direct same into the delivery chute; said delivery chute of such size and position to support said caps in a vertical plane so they will roll downwardly therein; means associated with the outlet for retaining caps in said chute; said means being actuated by containers for selectively releasing caps from said chute outlet and means for changing the relative position of said chute to accommodate containers of various sizes.

12. In combination; means including a magazine for supporting a plurality of caps; a hollow chamber beneath said magazine; a cap supporting delivery chute inclined from the horizontal; a reciprocable member; a flexible hollow cap engaging element carried by said reciprocable member; means to impress sub-atmospheric pressure to the interior of said cap engaging element whereby engagement of the latter with a cap in the magazine extracts same therefrom under the influence of the sub-atmospheric pressure; means for reciprocating said member for transferring the extracted caps to a different position; a pivotally supported arm; means on said arm engageable with said reciprocable member to cause said arm to impinge upon the transferred cap to direct same to slide downwardly through said hollow chamber to the delivery chute; said chute of such size and position to support said cap in a vertical position so it will roll downwardly therein on its peripheral skirt portion; means associated with the chute outlet for retaining caps in said chute; said means being actuated by containers for selectively releasing caps from said chute; means for changing the relative position of said cap chute to apply caps to containers of various sizes; and means controlled by the presence of a predetermined number of caps in said delivery chute for controlling the impression of sub-atmospheric pressure in said cap extracting member to control the extraction of caps from said magazine.

13. In combination, means including a magazine for supporting a plurality of caps; a cap supporting delivery chute; a reciprocable member; means including a flexible hollow cap engaging element carried by said reciprocable member; means to impress sub-atmospheric pressure to the interior of said cap engaging element whereby engagement of the latter with a cap in the magazine extracts same therefrom under the influence of the sub-atmospheric pressure; means for reciprocating said member for transferring the extracted caps to a different position; a pivotally supported arm; means on said arm engageable with said reciprocable member to cause said arm to impinge upon the transferred cap to direct same into the delivery chute; said chute designed to support said cap in a vertical position so it will roll downwardly therein on its peripheral skirt portions; means associated with the chute outlet for retaining caps in said chute; said means being actuated by containers for selectively releasing caps from said chute; means for changing the relative position of said cap chute to accommodate containers of various sizes; means controlled by the presence of a predetermined number of caps in said delivery chute for controlling the impression of sub-atmospheric pressure in said cap extracting member to control the extraction of caps from said magazine, and an adjustable collet type means disposed at the magazine outlet for temporarily distorting the closure in position to be extracted from the magazine whereby adhesion between adjacent closures is disrupted to assure the extraction of a single closure during each closure extracting movement of said reciprocable member.

14. In combination, means including a magazine for supporting a plurality of skirted caps; a delivery chute inclined with the horizontal; a reciprocable element; means to impress sub-atmospheric pressure to the interior of said element whereby engagement of the latter with a lowermost cap in the magazine extracts same therefrom under the influence of the sub-atmospheric pressure; said extracted caps being directed into said delivery chute where they will be supported in a vertical position so they will roll downwardly therein on their peripheral skirt portion; means disposed at the magazine outlet for temporarily distorting the closure in position to be extracted from the magazine whereby adhesion between adjacent closures is disrupted; said means including a hollow collet through which said closures are extracted, said hollow collet having a body formed with a tapered surface and a plurality of radially disposed slots running lengthwise thereof and a collar having a tapered surface arranged to engage said tapered surface on said body surrounding said collet for regulating the effective size of the interior diameter of said collet.

WILLY E. ZIMMERMAN.
HENRY C. KONRAD.

REFERENCES CITED

The following references are of record in the file of this patent:

UNITED STATES PATENTS

| Number | Name | Date |
|---|---|---|
| 2,074,815 | Tevander et al. | Mar. 23, 1937 |
| 2,076,116 | Brinton | Apr. 6, 1937 |
| 2,132,335 | White | Oct. 4, 1938 |
| 2,325,164 | Goodwin | July 27, 1943 |
| 2,340,639 | Brinton | Feb. 1, 1944 |
| 2,349,523 | Sonnenberg | May 23, 1944 |